United States Patent

Tsunoda et al.

[11] Patent Number: 6,069,430
[45] Date of Patent: May 30, 2000

[54] INSULATING MATERIAL AND WINDINGS THEREBY

[75] Inventors: Tomoya Tsunoda, Hitachi; Keiichi Morikawa, Komae; Mitsuru Onoda, Takahagi; Shigeo Amagi, Naka-gun; Tatsuo Honda, Hitachinaka, all of Japan

[73] Assignee: Hitachi, Ltd., Tokyo, Japan

[21] Appl. No.: 09/257,013

[22] Filed: Feb. 25, 1999

[30] Foreign Application Priority Data

Feb. 27, 1998 [JP] Japan .................................. 10-046820

[51] Int. Cl.$^7$ ...................................................... H02K 1/00
[52] U.S. Cl. .................................... 310/180; 174/120 SC; 174/120 SR; 29/596; 156/56
[58] Field of Search ............. 310/180, 45; 174/120 SR, 174/120 C, 102 SC; 29/596; 156/56; 427/104

[56] References Cited

U.S. PATENT DOCUMENTS

| | | | |
|---|---|---|---|
| 3,866,316 | 2/1975 | Takechi et al. .......................... 29/605 |
| 4,001,616 | 1/1977 | Lonseth et al. ........................... 310/45 |
| 4,157,414 | 6/1979 | Smith ...................................... 442/237 |
| 4,160,926 | 7/1979 | Cope et al. .............................. 310/215 |
| 4,376,904 | 3/1983 | Horrigan ................................. 310/208 |
| 4,400,226 | 8/1983 | Horrigan ................................... 156/56 |
| 4,427,740 | 1/1984 | Stackhouse et al. .................... 428/324 |
| 4,634,911 | 1/1987 | Studniarz et al. ....................... 310/215 |
| 4,760,296 | 7/1988 | Johnston et al. .......................... 310/45 |
| 4,806,806 | 2/1989 | Hjortsberg et al. ....................... 310/45 |
| 5,801,334 | 9/1998 | Theodorides ...................... 174/120 SR |

*Primary Examiner*—Nestor Ramirez
*Assistant Examiner*—Joseph Waks
*Attorney, Agent, or Firm*—Antonelli, Terry, Stout & Kraus, LLP

[57] ABSTRACT

The high thermoconductive insulating film 11 was formed around the outer periphery of the wound conductors 10, using the high thermoconductive insulating tape 1 comprising the mica layer 3, the reinforcement layer 5, and the high thermoconductive filler layer 7, wherein the resin content in each layer of the mica layer 3 and the high thermoconductive filler layer 7 is specified to the range of 10–25% by weight of the total weight of the material.

17 Claims, 3 Drawing Sheets

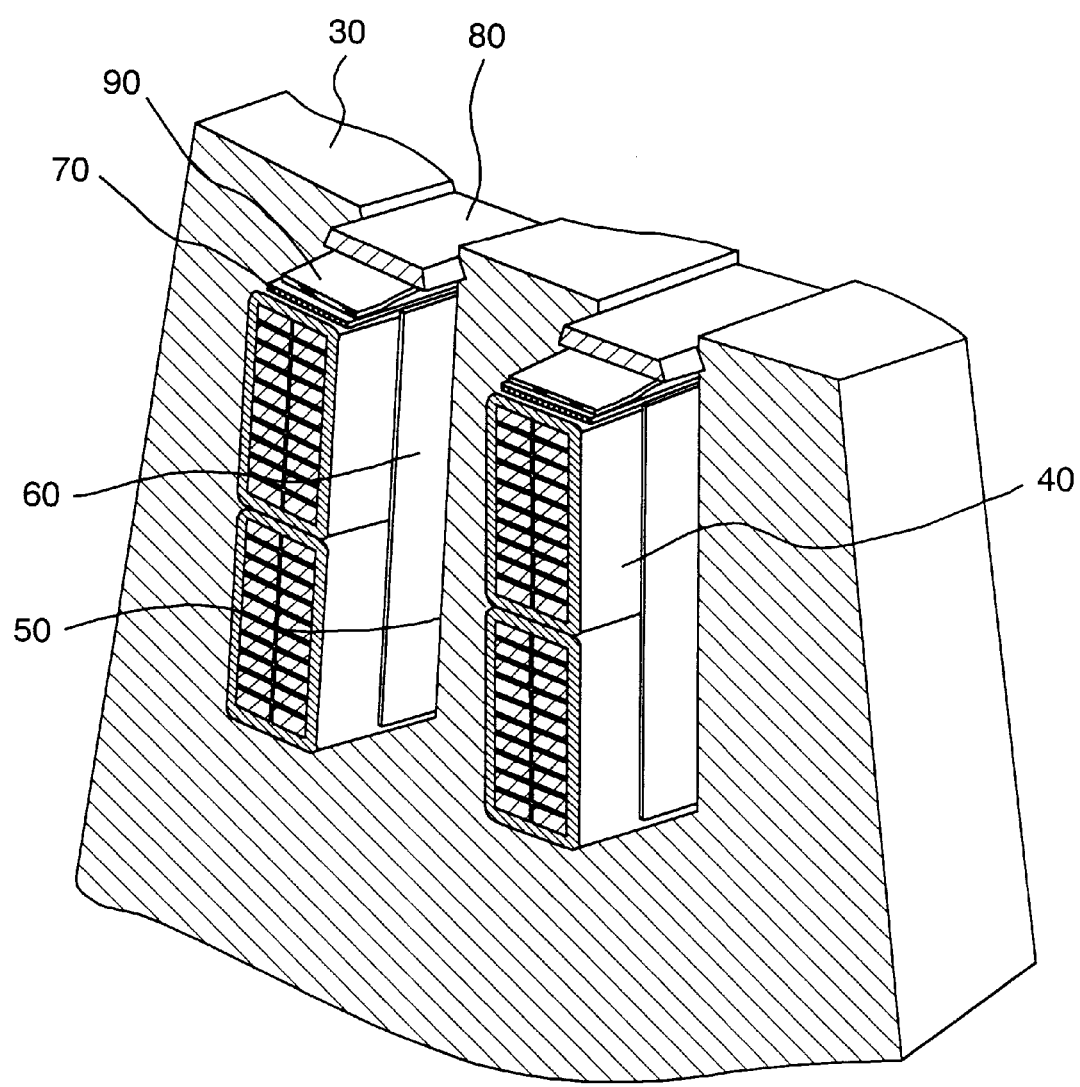

INSULATING MATERIAL AND WINDINGS THEREBY

BACKGROUND OF THE INVENTION

The present invention relates to windings for electric rotary machines, furthermore, to insulating material for forming an insulating film for windings of electrical machines.

Conventionally, insulating film for electrical windings used in electric rotary machines have been formed with an insulating material such as, for instance, disclosed in JP-A-63-110929 (1988). That is, the insulating material comprising a mica layer, a reinforcement layer, a filler layer including fillers having a high thermal conductivity therein, and resin contained in each layers has been used. The insulating material was wound around the outer periphery of the wound conductors, and the insulating film for windings of electrical machines was formed by curing the resin in the insulating material under a pressurizing state.

SUMMARY OF THE INVENTION

The insulating film for windings of electrical machines formed as described above with the insulating material as described above did not have any problem as far as it is used for the electric rotary machines operated with a low voltage. However, when it was used for electric rotary machines operated with a high voltage such as commercial power generators, high voltage motors, and the like, electrical defects have been readily generated, and its electrical characteristics had a tendency to be deteriorated.

In view of the above problems, the inventors of the present invention have studied reasons to make the electrical defects be readily generated. As the result, it was found that the reasons were as follows;

The reason was found that, when forming the insulating film for windings of electrical machines, a part of fine bubbles contained in any of the mica layers, filler layers, and the resin a were not removed with a part of the resin containing them, and were remained in the insulating material. And, this was caused by insufficient flow of impregnated resin in the insulating film during the pressurizing process when forming the insulating film for windings of electrical machines, because the resin content in each of the mica layer and the filler layer was not maintained at an appropriate content.

The present invention is aimed at providing windings for electrical machines having insulating film superior in electric characteristics. Furthermore, the present invention is aimed at providing insulating material, which makes it possible to obtain the insulating film for windings of electrical machines superior in electric characteristics.

The insulating material relating to the present invention comprises a mica layer, a reinforcement layer, and a filler layer, and concurrently, a resin content in each of the mica layer and the filler layer is specified to the range of 10–25% by weight of total weight of the insulating material.

The mica layer comprises mica flakes and/or mica particles.

The reinforcement layer comprises a reinforcing material, for instance, glass cloth. The filler layer comprises a filler having a thermal conductivity of at least 5 W/m·K, for instance, alumina. The insulating material is a laminated body of these layers in the order of the mica layer, the reinforcement layer, and the filler layer, or of the filler layer, the mica layer, and the reinforcement layer.

The insulating material further comprises resin, for instance, epoxy resin. Total content of the resin contained in the insulating material is in the range of 20–50% by weight of i he total weight of the insulating material, and the resin content in each of the mica layer and the filler layer is in the range of 10–25% by weight of the total weight of the insulating material.

The reason to specify the resin content in each of the mica layer and the filler layer at least 10% by weight of the total weight of the insulating material is that, when forming the insulating film for windings of electrical machines, it is necessary to make each of the mica layer and the filler layer contain resin of at least 10% by weight of the total weight of the resin, in order to remove the fine bubbles contained in each of the mica layer and the filler layer in the pressurizing process.

The reason to make the resin content in each of the mica layer and the filler layer equal to or less than 25% by weight of the total weight of the insulating material is that, if the resin content in each of the mica layer and the filler layer exceeds 25% by weight of the total weight of the insulating material, an operability in winding the insulating material onto the conductor is decreased, and the insulating material is wrinkled.

The insulating material relating to the present invention is specified that difference of the resin content in the mica layer from the resin content in the filler layer is equal to or less than 10% by weight.

The reason to make the difference of the resin content in the mica layer and the resin content in the filler layer equal to or less than 10% by weight is that, if the difference of the resin content in the mica layer and the resin content in the filler layer exceeds 10% by weight, a part of the resin containing the fine bubbles to be removed is transferred from the layer having a large resin content to the layer having a small resin content, and is remained therein in the pressurizing process at forming the insulating film for windings of electrical machines.

In accordance with the windings for electrical machines relating to the present invention, the insulating film is formed with an insulating material comprising a high dielectric strength layer, a reinforcement layer, and a having thermal conductivity layer, and the resin content in respective of the high dielectric strength layer and the layer having thermal conductivity is in the range of 10–25% by weight, respectively, of total weight of the insulating material.

The high dielectric strength layer is a mica layer comprising mica flakes. The reinforcement layer is a layer comprising a reinforcement material, for instance, glass cloth. The layer having thermal conductivity is a filler layer comprising a filler having a thermal conductivity of at least 5 W/m·K, for in,stance, alumina.

Each of the layers comprises a resin, for instance, epoxy resin.

Total resin content is in the range of 20–50% by weight of the total weight of the insulating material, and the resin content of the each layer of the mica layer and the filler layer is in the range of 10–25% by weight of the total weight of the insulating material. The difference of the resin content in the mica layer from the resin content in the filler layer is equal to or less than 10% by weight.

The reason to adjust the resin content in each of the mica layer and the filler layer to the range 10–25% by weight of the total weight of the insulating material is to obtain a desired electric characteristics, for instance, alternating insulation breakdown voltage of 26.5–29.0 kV/mm.

The insulating film for windings of electrical machines is formed using the insulating material as follows;

First, insulated conductors are wound several times for forming a wound conductor. Then, the insulating material is wound around the outer periphery of the wound conductor so that either of the mica layer, or the filler layer is to be closest to the wound conductor. Subsequently, a releasing agent is applied onto the outer periphery of the insulating material. A shape forming jig is attached to the winding, and an external force is applied from the surface via the jig. Then, the insulating film is formed by heating at a designated temperature for curing the resin in the insulating material with removing the fine bubbles contained in the insulating material with a part of the resin in the insulating material.

BRIEF DESCRIPTION OF THE DRAWINGS

FIG. 5 is a perspective view showing the stator slots.

DETAILED EXPLANATION OF THE PREFERRED EMBODIMENTS OF THE INVENTION

Figure 1A:
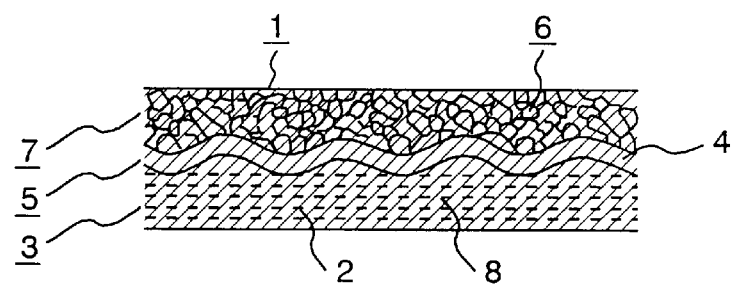
FIG. 1 is a cross sectional view indicating the material structure of the highly thermally conductive insulating tape of the embodiment of the present invention.
Figure 1B:

Hereinafter, an embodiment of the present invention is explained referring to drawings. A structure of material for the highly thermally conductive insulating tape (highly thermally conductive preimpregnated tape) of the embodiment of the present invention is explained hereinafter referring to FIG. 1a. The highly thermally conductive insulating tape 1 comprises a laminated body, wherein a mica layer 3 (high dielectric strength layer) comprising a small mica flakes sheet 2, a reinforcement layer 5 comprising glass cloth 4, and a highly thermally conductive filler layer (layer having thermally conductive) comprising alumina particles 6 are laminated in the order of the above description. The laminated body also may be formed by laminating in the order of the highly thermally conductive filler layer 7, the mica layer 3, and the reinforcement layer 5 as shown in FIG. 1b.

The highly thermally conductive insulating tape 1 also contains the resin 8 in each of the mica layer 3, the reinforcement layer 5, and the highly thermally conductive filler layer 7, and the total content of the resin 8 is 31.4% by weight of the total weight of the highly thermally conductive insulating tape 1. The resin content in the mica layer 3 is 12.9% by weight of the total weight of the highly thermally conductive insulating tape 1, and the resin content in the highly thermally conductive filler layer 7 is 15.0% by weight of the total weight of the highly thermally conductive insulating tape 1.

The highly thermally conductive insulating tape 1 was prepared as follows: First, a small mica flakes foil 2 (weight; 165 g/m$^2$) manufactured by a paper making machine with small mica flakes dispersed in water, and a glass cloth 4 (weight; 35 g/m$^2$) were prepared. A resin 8 composed by mixing BF$_3$ monoethylamine 3 parts by weight into novolak type epoxy resin 100 parts by weight was impregnated into the small mica flakes foil 2 and the glass cloth 4, and a small mica flakes sheet (a laminated body of the mica layer 3 and the reinforcement layer 5) was obtained by adhering the small mica flakes foil 2 and the glass cloth 4.

The resin 8 composed by mixing BF$_3$ monoethylamine 3 parts by weight into the novolak type epoxy resin 100 parts by weight, and alumina particles 6 were mixed so that a weight ratio of the alumina particles 6 to the resin 8 became 2:1. After adding methylethylketone of 10% by weight, the resin was applied onto the side plane of the reinforcement layer 5 of the small mica flakes sheet by a coater so that the applied amount of the resin became 256 g/m$^2$.

Then, the highly thermally conductive insulating sheet was obtained by evaporating and removing the methylethylketore.

The highly thermally conductive insulating tape 1 was obtained by slitting the highly thermally conductive insulating sheet to 30 mm wide by a slitter.

Figure 2:
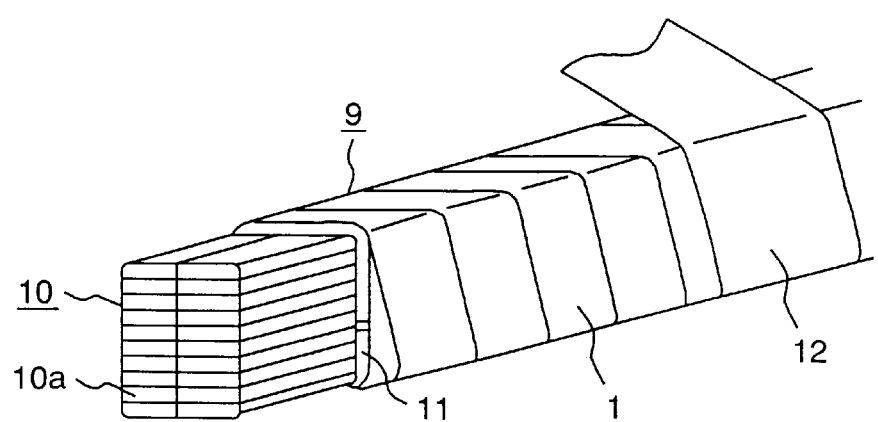
FIG. 2 is a perspective view indicating the structure of the windings for electrical machines of the embodiment of the present invention.

A structure of winding for electrical machines in the embodiment of the present invention is explained hereinafter referring to FIG. 2. The winding for electrical machine 9 comprises a wound conductor 10 formed by winding plural insulating conductors 10a, and highly thermally conductive insulating film 11 formed at the outer peripheral portion of the wound conductor 10.

The windings for electrical machines 9 was prepared as follows: First, a plurality of the insulated conductors 10a are wound several times for forming a wound conductor, as indicated in FIG. 2. Then, the highly thermally conductive insulating tape 1 indicated in FIG. 1 was wound around the outer periphery of the wound conductor. At this time, the highly thermally conductive insulating tape 1 could be wound irrelevant to either of the mica layer 3, or the highly thermally conductive filler layer 7 is closest to the wound conductor 10, but in the present embodiment, the highly thermally conductive insulating tape 1 was wound at the outer periphery of the wound conductors 10 so that the mica layer 3 was to be closest to the wound conductor 10. Subsequently, a releasing tape 12 was wound around the outer periphery of the highly thermally conductive insulating tape 1. The reason to wind the releasing tape 12 at the outer periphery of the highly thermally conductive insulating tape 1 is to prevent a shape forming jig, which would be explained later, from adhering to the highly thermally conductive insulating tape 1.

Figure 3:
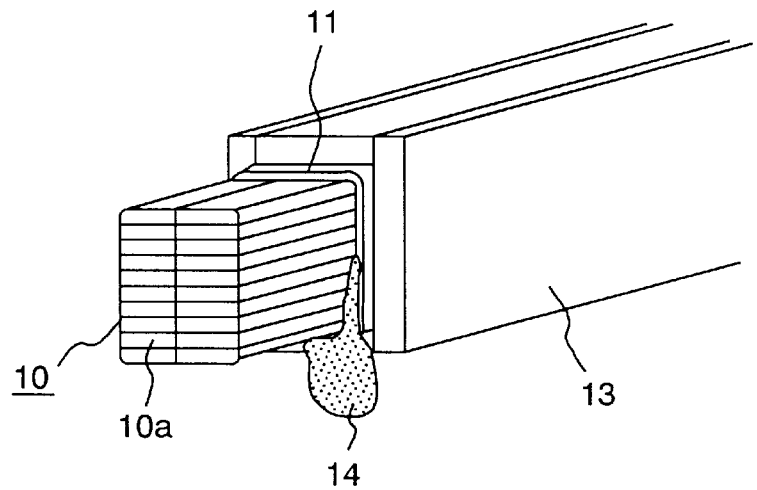
FIG. 3 is a perspective view for explaining a manufacturing process of the windings for electrical machines of the embodiment of the present invention.

Subsequently, a shape forming jig was attached to the wound conductor 10 as indicated in FIG. 3, and an external force was applied from the surface via the jig. Then, the highly thermally conductive insulating film 11 was formed by heating at a designated temperature for curing the resin 8 in the highly thermally conductive insulating tape 1 with removing the fine bubbles contained in the highly thermally conductive insulating tape 1 with a part of the resin 14 in the highly thermally conductive insulating tape 1, and the winding for electrical machines 9 was obtained.

The windings 9 for electrical machines of the present embodiment manufactured as above are assembled into core slot of electric rotary machines such as power generators, motors, and the like.

Figure 4:
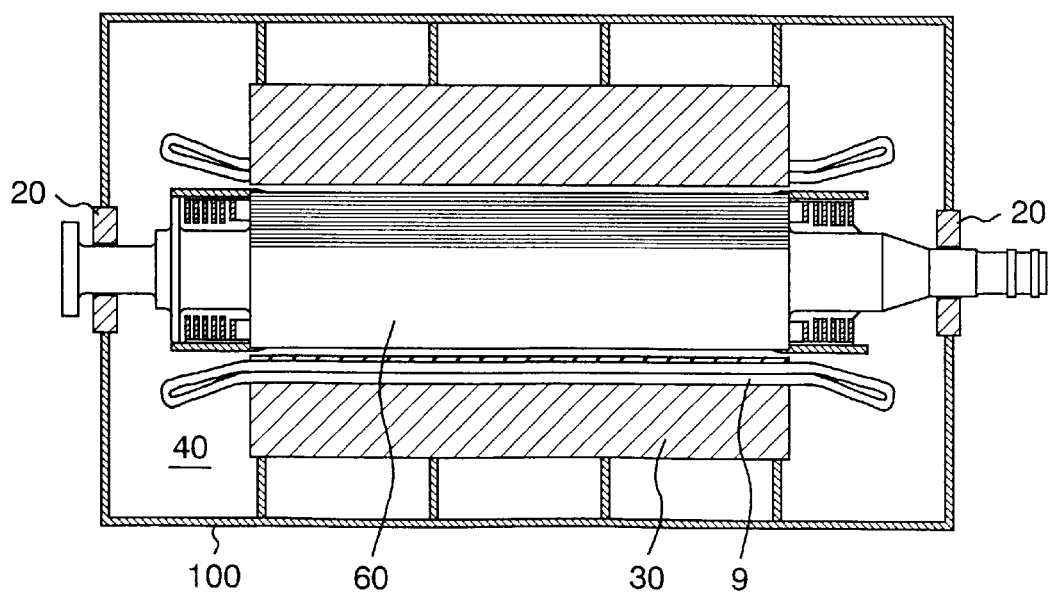
FIG. 4 is a cross sectional view of the generator.

FIGS. 4 and 5 is a cross sectional view showing a generator, and the winding 9 is inserted into slots 50 of the generator. The generator comprises a stator frame 100 supporting a bearing 20, a stator mounted on the stator frame 100 and a rotor composed of a rotor core 60 and rotatably mounted by the bearing 20 in the stator. The stator has a stator core 30, and the winding 9 inserted into the slots 50 is used as a stator coil 40. As shown in FIG. 5, the stator coil 40 is assembled into the sloils 50 and fixed by a spring 60 of fibrous glass reinforced plastics between the slots 50 and stator coil 40. A sheet 70 and spring 90 of fibrous glass reinforced plastics are sandwich between a wedge 80 and the stator to fix the stator winding 40 in the slots 50.

Next, results of tests on the alternating break down voltage of the windings for electric machines of the present embodiment and of windings for electric machines of the comparative example are explained based on Table 1. The windings for electric machines of the comparative example used in the tests were manufactured with highly thermally conductive insulation formed by highly thermally conductive insulating tape, which was prepared by the following process.

First, a small mica flakes foil 2(weight; 165 g/m$^2$) manufactured by a paper making machine with small mica flakes dispersed in water, and a glass cloth 4 (weight; 35 g/m$^2$ were prepared. A resin composed by mixing BF$_3$ monoethylamine 3 parts by weight into novolak type epoxy resin 100 parts by weight was impregnated into the small mica flakes foil 2 and the glass cloth 4, and a small mica flakes sheet (a laminated body of the mica layer 3 and the reinforcement layer 5) was obtained by adhering the small mica flakes foil 2 and the glass cloth 4.

The resin composed by mixing BF$_3$ monoethylamine 3 parts by weight to the novolak type epoxy resin 100 parts by weight, and alumina particles were mixed so that a weight ratio of the alumina particles to the resin became 3.5:1. After adding methylethylketone of 10% by weight, the resin was applied onto the side plane of the reinforcement layer 5 of the small mica flakes sheet by a coater so that the applied amount of the resin became 230 g/m$^2$. Then, the highly thermally conductive insulating sheet was obtained by evaporating and removing the methylethylketone.

The highly thermally conductive insulating tape 1 was obtained by slitting the highly thermally conductive insulating sheet to 30 mm wide by a slitter.

The total resin content in the highly thermally conductive insulating tape of the comparative example manufactured as above was 19.3% by weight of the total weight of the highly thermally conductive insulating tape. The resin content in the mica layer was 19.3% by weight of the total weight of the highly thermally conductive insulating tape, and the resin content in the highly thermally conductive filler layer was 10.4% by weight of the total weight of the high thermoconductive insulating tape.

The windings for electrical machines 9 was prepared using the highly thermally conductive insulating tape manufactured as above. The method of manufacturing was as same as the present embodiment. Its explanation is omitted.

In the test on the alternating break down voltage, an aluminum foil was wound respectively around the outer periphery of the windings for electrical machines of the present embodiment and of the comparative example as an electrode, and the alternating break down voltages were measured by supplying an alternating voltage between the aluminum electrode and the winding conductor of each of windings for electrical machines. The results were as shown in Table 1.

TABLE 1

Results of measuring insulation break down voltage

|  | Embodiment | Comparative example |
|---|---|---|
| Observed values (kV/mm) | 26.5<br>29.0<br>27.5 | 19.0<br>17.5<br>21.5 |
| Average (kV/mm) | 27.7 | 19.3 |

As indicated in Table 1, the windings for electric machines of the present embodiment had higher alternating break down voltage than the windings for electric machines of the comparative example. This was, because the highly thermally conductive insulating film of the winding for electrical machines was formed using the highly thermally conductive insulating tape, wherein the resin content in each of the mica layer and the highly thermally conductive filler layer was specified to the range of 10–25% by weight of the total weight of the material, and because fine bubbles contained in the highly thermally conductive insulating tape could be removed sufficiently with a part of the resin in the highly thermally conductive tape in the pressurizing process during forming the highly thermally conductive insulating film of the windings for electrical machines.

Accordingly, because the windings for electrical machines of the present embodiment is provided with a dense highly thermally conductive insulating film superior in electrical characteristics, a high reliability can be provided to the electric rotary machines operated with a high voltage.

In accordance with the insulating material relating to the present invention, the highly thermally conductive insulating film superior in electrical characteristics can be obtained, because the resin content in each of the mica layer and the highly thermally conductive filler layer is specified to the range of 10–25% by weight of the total weight of the material, and fine bubbles contained in the highly thermally conductive insulating tape can be removed sufficiently with a part of the resin in the highly thermally conductive tape in the pressurizing process during forming the highly thermally conductive insulating film of the windings for electrical machines.

In accordance with the resin content specified as above, decrease of workability and causing wrinkles to the insulating material during winding the wound conductors with the insulating material can be prevented. Therefore, generation of voids in the insulating film of the windings for electrical machines, which will cause an electrical defect, can be prevented; and the highly thermally conductive insulating film superior in electrical characteristics can be obtained.

In accordance with the insulating material relating to the present invention, the highly thermally conductive insulating film superior in electrical characteristics can be obtained. Because difference of the resin content in the mica layer from the resin content in the filler layer is specified equal to 10% by weight or less, a part of the resin including fine bubbles therein, which should be removed outside, can be prevented from entering and remaining into the one layer of smaller resin content from the other layer of larger resin content.

In accordance with the windings for electrical machines relating to the present invention, the highly reliable windings for electrical machines having the insulating film superior in electrical characteristics, and the electrical characteristics, which will not be deteriorated even if the windings are used in any electric rotary machines, can be obtained. Because the insulating film is formed using the insulating material, wherein the resin content in each of the mica layer and the highly thermally conductive filler layer is specified to the range of 10–25% by weight of the total weight of the insulating material, fine bubbles contained in the highly thermally conductive insulating tape can be removed sufficiently with a part of the resin in the highly thermally conductive tape in the pressurizing process during forming the highly thermally conductive insulating film of the windings for electrical machines.

If the insulating film is formed using the insulating material, wherein the resin content is specified to the range as above, decrease of workability and causing generation of wrinkles to the insulating material during winding the wound conductors with the insulating material can be prevented. Therefore, generation of voids in the insulating film of the windings for electrical machines, which will cause an electrical defect, can be prevented; and the highly reliable windings for electrical machines having the highly thermally conductive insulating film superior in electrical characteristics, and the electrical characteristics, which will not be deteriorated even if the windings are used in any electric rotary machines, can be obtained.

In accordance with the windings for electrical machines relating to the present invention, its insulating film is formed using the insulating material; wherein, because the difference of the resin content in the mica layer from the resin content in the filler layer is specified equal to 10% by weight or less, a part of the resin including fine bubbles therein, which should be removed outside, can be prevented from entering and remaining into the one layer of smaller resin content from the other layer of larger resin content; and the highly reliable windings for electrical machines having the highly thermally conductive insulating film superior in electrical characteristics, and the electrical characteristics, which will not be deteriorated even if the windings are used in any electric rotary machines, can be obtained.

What is claimed is:

1. An insulating material comprising a mica layer, a reinforcement layer, and a filler layer, with the mica layer and the filler layer including a resin, wherein a resin content in each of said mica layer and said filler layer is in a range of 10–25% by weight, respectively, of total weight of said insulating material.

2. An insulating material as claimed in claim 1, wherein the resin content in said mica layer differs from the resin content in said filler layer by 10% by weight or less.

3. An insulating material as claimed in claim 1, wherein the resin content in the mica layer and the resin content in the filler layer are substantially equal to each other.

4. An insulating material as claimed in claim 1, wherein a total resin content in said insulating material is in a range of 20–50% by weight of the total weight of said insulating material.

5. An insulating material as claimed in claim 1, wherein said filler layer comprises a filler material having a thermal conductivity of at least 5 W/m·K.

6. An insulating material as claimed in claim 1, wherein said resin is an epoxy resin.

7. A winding for electrical machines comprising an insulating material having a high dielectric strength layer, a reinforcement layer, and a layer having thermal conductivity, with at least each of the high dielectric strength layer and the layer having thermal conductivity including a resin; wherein a resin content in each of said high dielectric strength layer and said layer having thermal conductivity is in a range of 10–25% by weight, respectively, of total weight of said insulating material; and said insulating material is formed so that said high dielectric strength layer of said insulating material is placed closer to a wound conductor than said layer having thermal conductivity and said reinforcement layer.

8. A winding for electrical machines comprising an insulating material having a high dielectric strength layer, a reinforcement layer, and a layer having thermal conductivity, with at least each of the high dielectric strength layer and the layer having thermal conductivity including a resin; wherein a resin content in each of said high dielectric strength layer and said layer having thermal conductivity is in a range of 10–25% by weight, respectively, of total weight of said insulating material; and said insulating material is formed so that said layer having thermal conductivity, of said insulating material, is placed closer to a wound conductor than said high dielectric strength layer and said reinforcement layer.

9. A winding for electrical machines comprising an insulating film, which comprises a high dielectric strength layer, a reinforcement layer, and a layer having thermal conductivity, with at least each of the high dielectric strength layer and the layer having thermal conductivity including a resin; wherein an alternating insulation breakdown voltage of said insulating film is set in a range of 26.5–29.0 kV/mm by adjusting a resin content in each of said high dielectric strength layer and said layer having thermal conductivity, the resin content in each of said high dielectric strength layers and said layer having high thermal conductivity being in a range of 10–25% by weight, respectively, of total weight of the insulating film.

10. A winding for electrical machines as claimed in claim 9, wherein the resin content in said mica layer differs from the resin content in said filler layer by 10% by weight or less.

11. A winding for electrical machines comprising an insulating film composed of an insulating material, which comprises a mica layer, a reinforcement layer, and a filler layer, with each of the mica layer and the filler layer including a resin; wherein a resin content in each of said mica layer and said filler layer is in a range of 10–25% by weight, respectively, of total weight of said insulating material.

12. A winding for electrical machines as claimed in claim 11, wherein a total resin content in said insulating material is in a range of 20–50% by weight of the total weight of said insulating material.

13. A winding for electrical machines as claimed in claim 11, wherein said filler layer of said insulating material comprises a filler material having a thermal conductivity of at least 5 W/m·K.

14. An electric rotary machine provided with a winding for electrical machines as claimed in any one of claim 5 to claim 12.

15. An insulating material comprising:
a reinforcement layer having two surfaces;
a mica layer, which includes a resin formed on one surface of said reinforcement layer; and
a filler layer, which includes a resin, formed on the other surface of said reinforcement layer, wherein a resin content in each of said mica layer and said filler layer is in a range of 10–25% by weight, respectively, of total weight of said insulating material.

16. An insulating material comprising:
a reinforcement layer having two surfaces;
a mica layer, which includes a resin, formed on one surface of said reinforcement layer; and a filler layer, which includes a resin, formed on said mica layer, wherein a resin content in each of said mica layer and said filler layer is in a range of 10–25% by weight, respectively, of total weight of said insulating material.

17. An insulating film comprised of an insulating material which includes a mica layer, a reinforcement layer and a filler layer, each of the mica layer and the filler layer including a resin, and wherein a content of the resin in each of said mica layer and said filler layer is in a range of 10–25% by weight of total weight of said insulating material, so as to avoid bubbles in the insulating film occurring when the mica layer or the filler layer contains less than 10% by weight, of the total weight of the insulating material, of the resin.

* * * * *